United States Patent [19]
Gost

[11] Patent Number: 5,574,318
[45] Date of Patent: Nov. 12, 1996

[54] MULTI-PORT JOYSTICK SWITCHBOX

[76] Inventor: Patrick E. Gost, 25421 Gallup Cir., Laguna Hills, Calif. 92653

[21] Appl. No.: 195,536
[22] Filed: Feb. 14, 1994
[51] Int. Cl.$^6$ ...................................................... A63B 71/00
[52] U.S. Cl. ........................................ 307/112; 278/148 B
[58] Field of Search ...................................... 307/112, 113, 307/115, 125, 147; 273/148 B; 439/638, 651, 652, 653; 200/1 R, 2 R

[56] References Cited
FOREIGN PATENT DOCUMENTS
3816488A1  11/1989  Germany ......................... G06F 3/033

*Primary Examiner*—Jonathan Wysocki
*Assistant Examiner*—Jonathan S. Kaplan
*Attorney, Agent, or Firm*—Gene Scott; Patent Law & Venture Group

[57] ABSTRACT

A switching device for connecting four input devices and two auxiliary devices to a common output device is disclosed. A first 4-position 15-pole switch connects any one of four 15-pin input connectors to 15 common output lines in one-to-one correspondence. Two of these 15 inputs are routed through the first position of a second switch that has three positions and two poles. The second and third positions of the second switch are interconnected with two auxiliary input connectors, respectively, for accepting signals from the auxiliary devices instead of the first switch. A pair of output lines from the second switch is interconnected with the two remaining open pins of the output connector. As such, any one of the four input devices and either or neither of the auxiliary devices is switchable to the output device.

4 Claims, 3 Drawing Sheets

FRONT PANEL OF ENCLOSURE

BACK PANEL OF ENCLOSURE

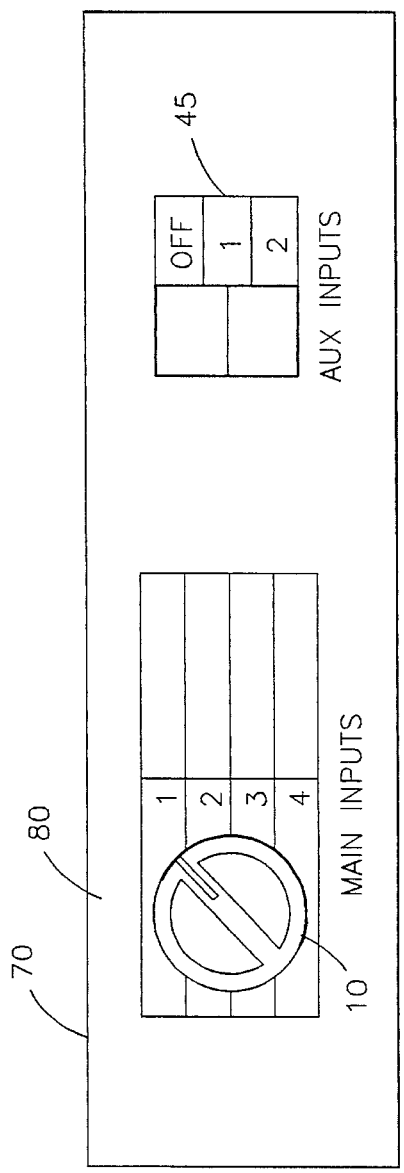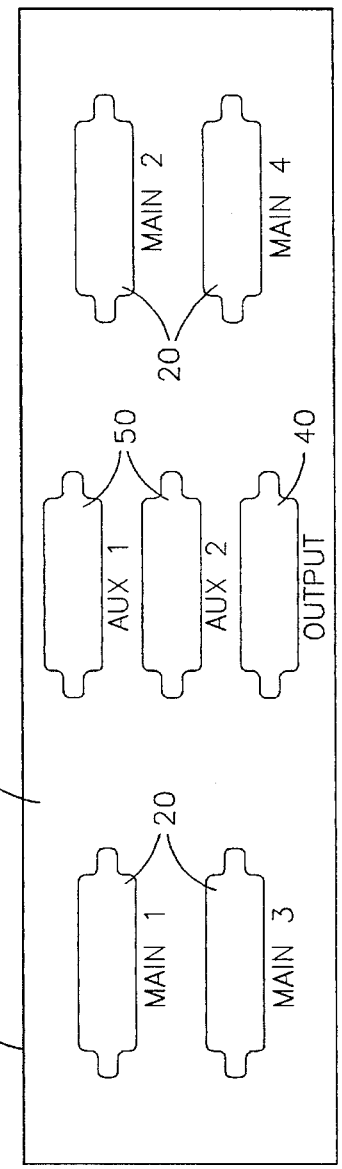

5,574,318

MULTI-PORT JOYSTICK SWITCHBOX

FIELD OF THE INVENTION

This invention relates generally to switching devices, and, more particularly, is directed towards a switching device for connecting a number of input devices and two auxiliary devices to a common output device.

BACKGROUND OF THE INVENTION

Many computer video games require the use of an input device for controlling various aspects of the game. While some games are best used with a conventional joystick controller having a "fire" button, for example, other controllers, such as those with foot pedals or steering wheel controllers, are more useful with other games. As a result, when switching between games it is often desirable to also change the type of input controller. Changing controllers usually requires gaining access to a rear side of the computer and unplugging or unscrewing a connector from an input jack on the computer. This can be a tedious process if requiring movement of the computer or furniture.

Selector switches with multiple poles and multiple positions are well known in the prior art, and can be used to overcome the drawback of having to frequently swap controllers for video games. A typical prior art switch in the field of this invention is taught in German Patent 3,816,488 to Hansmann et al. on Nov. 23, 1989, which allows switching of pairs of joysticks to a single input port.

Such solutions, while suitable for switching between controllers, are not well suited for switching between certain functions from one controller independently of certain other functions from another controller. Indeed, with some games it may be desirable to combine the fire button on one controller with foot pedals of another controller, for example. Further, some game controllers require continuous power, even if another controller is being used. Such prior art devices make no provision for maintaining power to certain controller devices even when not currently selected.

Clearly, then, there is a need for a switching device that not only allows for easy, manual switching between several input devices, but also allows for switching certain functions from one controller and certain other functions from another controller to a common output connector. Such a needed device would make provision for supplying continuous power to certain controller input ports. Such a needed controller mixing device would further be easy to manufacture, maintain, and use. The present invention fulfills these needs and provides further related advantages.

SUMMARY OF THE INVENTION

The present invention is a switching device for selecting between four or more input devices and two auxiliary devices to a common output device. In the preferred embodiment, a first 4-position 15-pole switch connects any one of four 15-pin input connectors to 15 common output lines in one-to-one correspondence. Two of these 15 inputs are routed through the first position of a second switch that has three positions and two poles. The second and third positions of the second switch are interconnected with two auxiliary input connectors, respectively, for accepting signals from the auxiliary devices instead of from the first switch. A pair of output lines from the second switch is interconnected with the two remaining open pins of the output connector. As such, any one of the four input devices and either or neither of the auxiliary devices is switchable to the output device. The device is packaged in a small enclosure easily placed near a computer control center. It eliminates the need to switch cables from one connector to another.

The present invention is a switching device that not only allows for easy, manually switching between several input devices, but also allows for mixing certain functions from one controller with certain other functions from another controller to a common output connector. The present device further supplies power to at least one input port continuously, even if it is not selected. The present device is also easy to manufacture, maintain, and use. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 2 is a front elevational view of the invention, illustrating a front panel of an enclosure; and FIG. 3 is a rear elevational view of the invention, illustrating a rear panel of the enclosure.

DETAILED DESCRIPTION OF THE PREFERRED EMBODIMENT

Figure 1A:
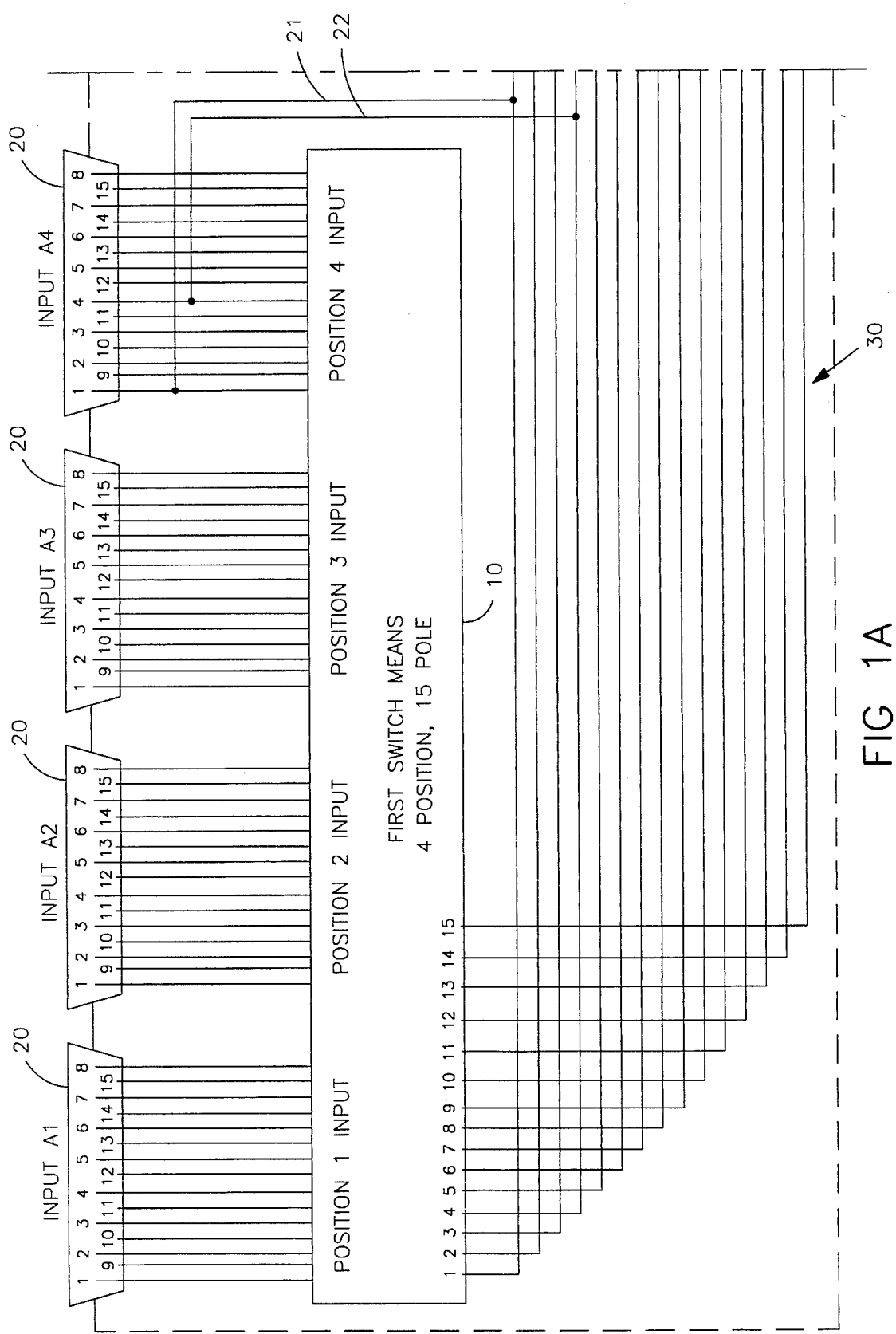
FIG. 1A is a partial schematic diagram of a switching device, illustrating a number of input ports, and is continued on another sheet as FIG. 1B.
Figure 1B:
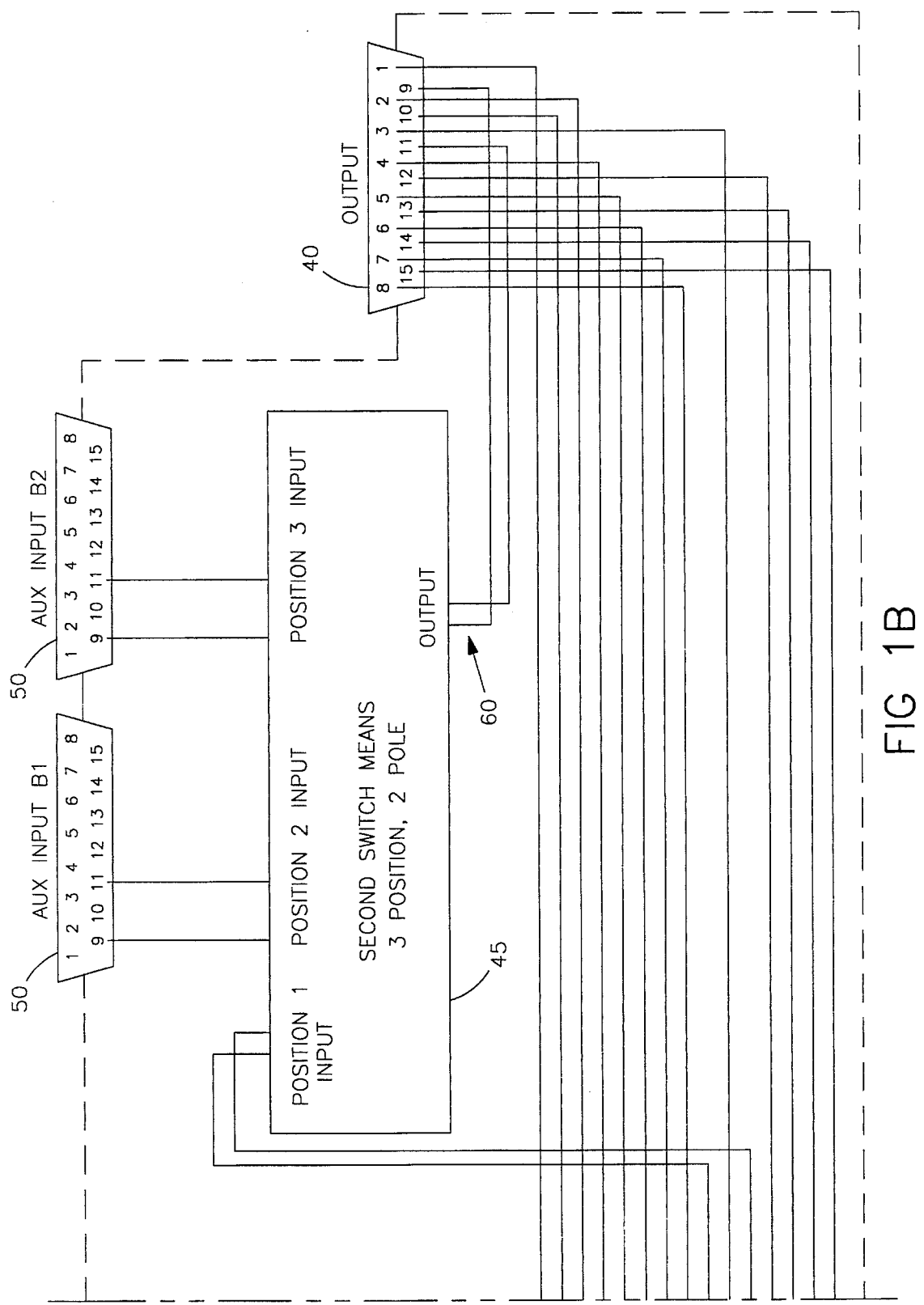
FIG. 1B is a partial schematic diagram of the switching device, continued from FIG. 1A, illustrating a first switching means and a second switching means for mixing the number of primary input ports with one of two auxiliary input ports.

FIGS. 1 and 2 show a switching device for connecting a number M of input devices and at least one auxiliary device to a common output device. A first switch means 10, such as a conventional rotary switch, has M number of positions and N number of poles for connecting any one of M input, N-pin connectors 20 to N number of common output lines 30. Each of the M input connectors 20 provides input lines 1, 2, 3, ..., N in line-for-line correspondence for switched interconnection with the corresponding output lines 1, 2, 3, ..., N. The output lines 30 provide electrical interconnection between the first switch means 10 and N–2 pins of an N-pin output connector 40. The output lines 30 further provide interconnection to a first position of a second switch means 45 that typically has 3 positions and 2 poles. The second and third positions of the second switch means 45 are interconnected with two auxiliary input connectors 50, respectively, for accepting signals from the auxiliary devices. The second switch means 45 is preferably a three-position slide-type linear switch, or a rotary switch.

For example, in one embodiment of the invention, first switch means 10 has 4 positions and 15 poles for connecting any one of 4 input, 15-pin connectors 20 to 15 common output lines 30. Each of the 4 input connectors 20 provides input lines 1–15 in line-for-line correspondence for switched interconnection with the corresponding output lines 1–15. The output lines 30 provide electrical interconnection between the first switch means 10 and 13 pins of the 15-pin output connector 40. The second and third positions of the second switch means 45 are interconnected with two auxiliary input connectors 50, respectively, for accepting signals from the auxiliary devices. The pair of output lines 60 from the second switch means 45 is interconnected with the two pins of the output connector 30 that are not connected to the first switch means 10. In FIG. 1, these two pins are pins 9 and 11. As such, any one of the 4 input devices and either or neither of the two auxiliary devices is switchable to the output device.

Preferably, an enclosure 70 is included that has a front panel 80 (FIG. 2) and a rear panel 90 (FIG. 3). The enclosure 70 is made from a suitably rigid material, such as plastic or sheet metal. The first and second switch means 10,45 are mounted on the front panel 80, and are manually selectable therefrom. The M number of input connectors 20, the two auxiliary connectors 50, and the output connector 40 are mounted on the rear panel 90 for access to cables for interconnecting the switching device to the input, auxiliary, and output devices.

In an alternative embodiment, two electrical lines 21,22 are added for shorting between pins 1 and 4 of at least one of the input connectors 20, and lines 1 and 4 respectively of the output lines 30. In FIG. 1A, lines 21,22 are shown connected to input connector A4. This modification provides power continuity to a joystick or other device connected through input connector A4 even when it is not in actual use, thereby establishing and maintaining circuits relying on such continuity. For example, some game controllers are connected to a computer keyboard port in addition to a game port, so power is continuously required for such devices in order for the keyboard to function.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A switching device for connecting M input devices and at least one auxiliary device to a common output device, the switching device comprising:

a first switch means having M-positions and N-poles switchably adapted for connecting one of a plurality of M input connectors, each having N-pins, wherein said first switch means further connected to N first switch means output lines, the N output lines interconnected with N–2 pins of an output connector;

a second switch means having three positions and 2-poles switchably adapted for connecting either one of two auxiliary input connectors or two of the N output lines to two second switch means output lines, the two second switch means output lines connecting to two further pins of the output connector;

whereby any of the M input connectors and either or neither of the auxiliary input connectors may be interconnected with the output connector.

2. The switching device of claim 1 further including an enclosure having a front panel and a rear panel, the front panel having mounted thereon at least one of the first and second switch means, said first and second switch means being manually adjustable, the rear panel supporting the M input connectors and the two auxiliary input connectors and the output connector, whereby cables may be connected to the input and auxiliary input connectors and output connector for interconnecting the switching device to input, auxiliary, and output devices.

3. The switching device of claim 1 further including electrical connection lines between at least one of the input connectors and the first output lines to establish power continuity to the at least one of the input connectors.

4. The switching device of claim 2 wherein the M input connectors are each a 15 pin connector and the first switch means is a 4 position, 15 pole rotary switch.

\* \* \* \* \*